United States Patent [19]

Sterbenz et al.

[11] Patent Number: 5,136,989
[45] Date of Patent: Aug. 11, 1992

[54] TWO-STROKE CYCLE INTERNAL COMBUSTION ENGINE

[76] Inventors: Albin Sterbenz, Friedmanngasse 20, A-8041 Graz; Franz Laimböck, Waldsdorfberg 86, A-8051 Graz-Thal, both of Austria

[21] Appl. No.: 698,464

[22] Filed: May 10, 1991

[30] Foreign Application Priority Data

May 15, 1990 [AT] Austria .................................. 1069/90

[51] Int. Cl.⁵ ............................................ F02B 75/02
[52] U.S. Cl. .................................... 123/65 PE; 123/323
[58] Field of Search ............... 123/73 R, 65 PE, 65 P, 123/65 V, 323, 65 A

[56] References Cited

U.S. PATENT DOCUMENTS

| 4,399,788 | 8/1983 | Bostelmann | 123/65 PE |
| 4,516,540 | 5/1985 | Nerstrom . | |
| 4,541,371 | 9/1985 | Kageyama et al. | 123/65 PE |
| 4,751,899 | 6/1988 | Ohki et al. | 123/65 PE |
| 4,768,473 | 9/1988 | Yamamoto et al. . | |
| 4,776,305 | 10/1988 | Oike | 123/65 PE |
| 4,945,868 | 8/1990 | Klomp | 123/323 |
| 4,969,329 | 11/1990 | Bolton et al. | 60/288 |
| 4,969,330 | 11/1990 | Groff et al. | 123/65 PE |
| 4,993,373 | 2/1991 | Klomp et al. | 123/65 PE |
| 5,063,887 | 11/1991 | Ozawa et al. | 123/65 PE |

FOREIGN PATENT DOCUMENTS

| 719509 | 3/1942 | Fed. Rep. of Germany ... 123/65 PE |
| 1474301 | 4/1989 | U.S.S.R. ........................ 123/65 PE |
| 2177755 | 7/1989 | United Kingdom . |

Primary Examiner—E. Rollins Cross
Assistant Examiner—Thomas N. Moulis
Attorney, Agent, or Firm—Collard & Roe

[57] ABSTRACT

A two-stroke-cycle internal combustion engine designed for crankcase scavenging has an exhaust passage, which extends from an exhaust window in the cylinder wall and which contains a control member, which is adjustable in the direction of travel of the piston to adjust the flow area of the exhaust window in dependence on one or more operational parameters of the internal combustion engine, in particular, in dependence on its speed. In order to minimize the scavenging losses and to permit the engine to combust even very lean mixtures while having a good drivability, the control member conforms to the flow lines in the exhaust passage and constitutes that edge of the exhaust window which is nearer to the crankshaft and said control member is movable to adjust said edge.

1 Claim, 4 Drawing Sheets

TWO-STROKE CYCLE INTERNAL COMBUSTION ENGINE

BACKGROUND OF THE INVENTION

1. Field of the Invention

This invention relates to a two-stroke cycle internal combustion engine designed for crankcase scavenging and comprising an exhaust passage which extends from an exhaust port in the cylinder wall and which contains a control member, which is adjustable in the direction of travel of the piston to adjust the flow area of the exhaust port in dependence on one or more operational parameters of the internal combustion engine, in particular, in dependence on its speed.

2. Description of the Prior Art

Two-stroke cycle internal combustion engines of that kind are already known, e.g., from British Patent Specification 2,177,755, U.S. Pat. Nos. 4,516,530, and 4,768,473. But in those known engines the control member is so arranged and designed that it is operable to adjust that edge of the exhaust port which is remote from the crankshaft in order to prolong or shorten the exhaust time in dependence on speed in adaptation on the operating conditions. From British Patent Specification 2,177,755 it is also known to provide two lateral exhaust passages in addition to a main exhaust passage and also to provide an air chamber, which is closed to the outside and adapted to be connected to the exhaust system. In that case the control member serves also for selectively closing the lateral exhaust passages and the air chamber so that the opening period of the main exhaust passage and of the lateral exhaust passages can be reduced during an operation at low speed whereas during an operation at high speed the flow areas of the exhaust passages can be entirely opened and the air chamber can be closed in order to increase the power of the engine. But the scavenging losses cannot be decreased by such measures.

In internal combustion engines in which the pollutant content of the exhaust gas is minimized and in which exhaust systems comprising a catalytic converter can be used, it is essential to minimize the emission of pollutants from the internal combustion engine. For this reason the scavenging losses should be minimized and the internal combustion engine is desired to combust even very lean mixtures while having a good driveability.

SUMMARY OF THE INVENTION

For this reason it is an object of the invention so to improve the internal combustion engine described first hereinbefore that said requirements will be met.

The object set forth is accomplished in accordance with the invention in that the control member conforms to the flow lines in the exhaust passage and constitutes that edge of the exhaust port which is nearer to the crankshaft and said control member is movable to adjust said edge.

During an operation of the internal combustion engine at low speeds or under light loads, that edge of the exhaust port which is nearer to the crankshaft is displaced toward the combustion chamber, away from the crankshaft, so that the exhaust port is reduced in size. A favorable influence is thus exerted on the change of the cylinder charge so that the scavenging losses are decreased. This permits the use of a distinctly leaner air-fuel mixture which is supplied whereas the driveability of the internal combustion engine will not adversely be affected and cyclic fluctuations and misfires will not be induced. This will result in lower concentrations of unburnt hydrocarbons in the still existing scavenging losses so that the fuel consumption will be decreased. The displacement of that lower edge of the exhaust port which is nearer to the crankshaft in the direction from the crankshaft toward the combustion chamber will not change the control time but will change only that flow area of the exhaust passage which is associated with the instantaneous crank angle, i.e., the time-dependent flow area. Because the control member conforms to the flow lines, the adverse influence on the flow conditions in the region downstream of the exhaust port will be minimized.

In an internal combustion engine in which the exhaust passage consists of a main exhaust passage and two lateral exhaust passages which adjoin respective exhaust ports said lateral exhaust passages can be closed in accordance with the invention by the control member when it is in its end position remote from the crankshaft. This will also improve the exhaust behavior and the driveability of the internal combustion engine during an operation at low speeds and under light loads. The effect of the control member may be improved if fresh gas contained in the exhaust system is recycled to the charge even during an operation at low speeds. For this reason an air chamber may be provided, which is closed toward the outside and adapted to be connected to the exhaust system, and the control member may be coupled to the means for closing said air chamber in such a manner that the air chamber will be opened as the control member is moved toward its end position that is remove from the crankshaft. When in such an arrangement that edge of the exhaust post which is nearer to the crankcase is in its end position that is remove from the crankshaft, the air chamber will be opened so that the torque can be increased and the pollutant content of the exhaust gas will be decreased further.

DETAILED DESCRIPTION OF THE PREFERRED EMBODIMENT

Figure 1:
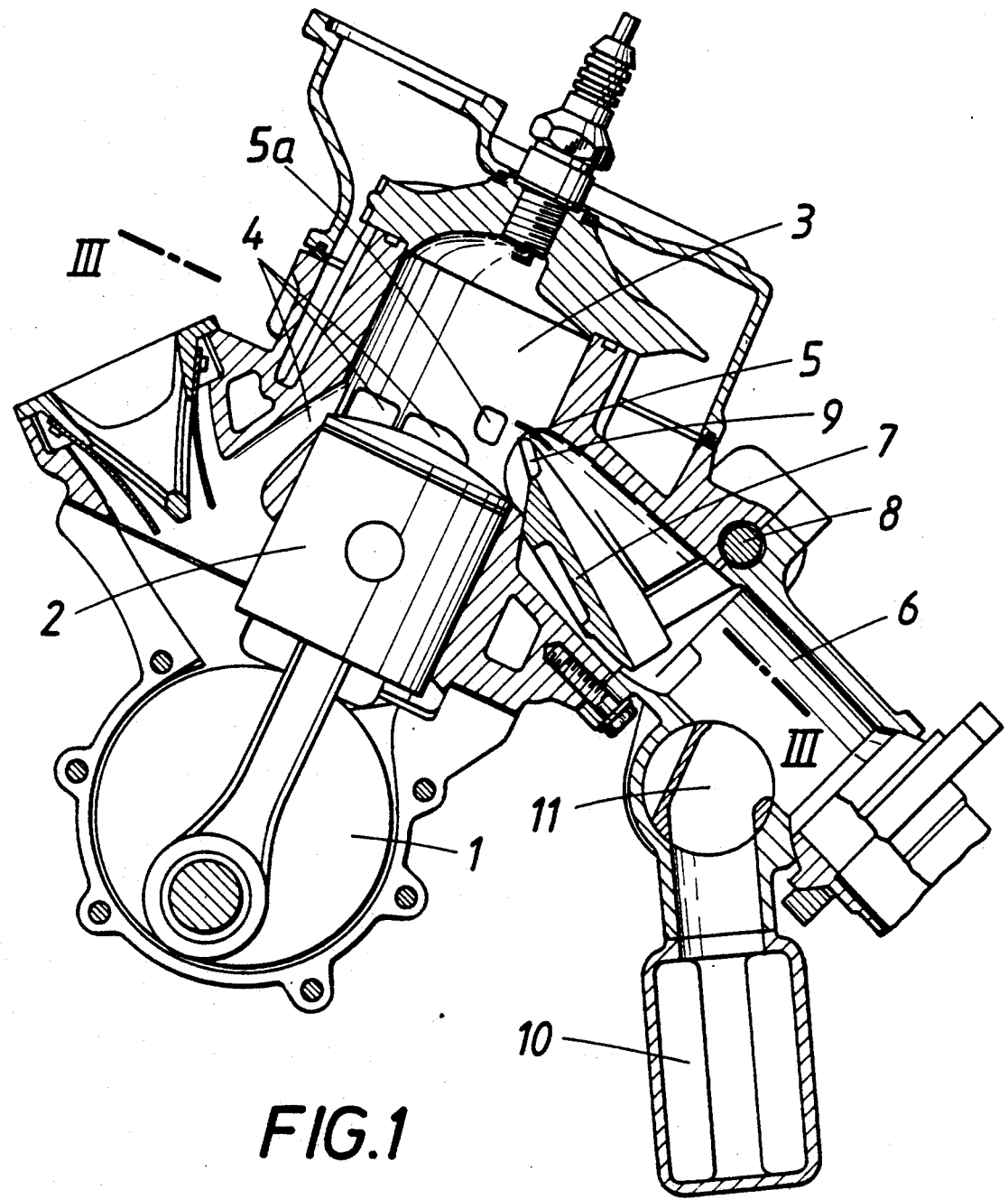
FIG. 1 is a longitudinal sectional view on a plane which extends through the cylinder axis of a two-stroke cycle internal combustion engine designed for crankcase scavenging; the control member is shown in its end position that is remote from the crankshaft.

An illustrative embodiment of the invention will now be described more in detail with reference to the drawing.

Figure 3:
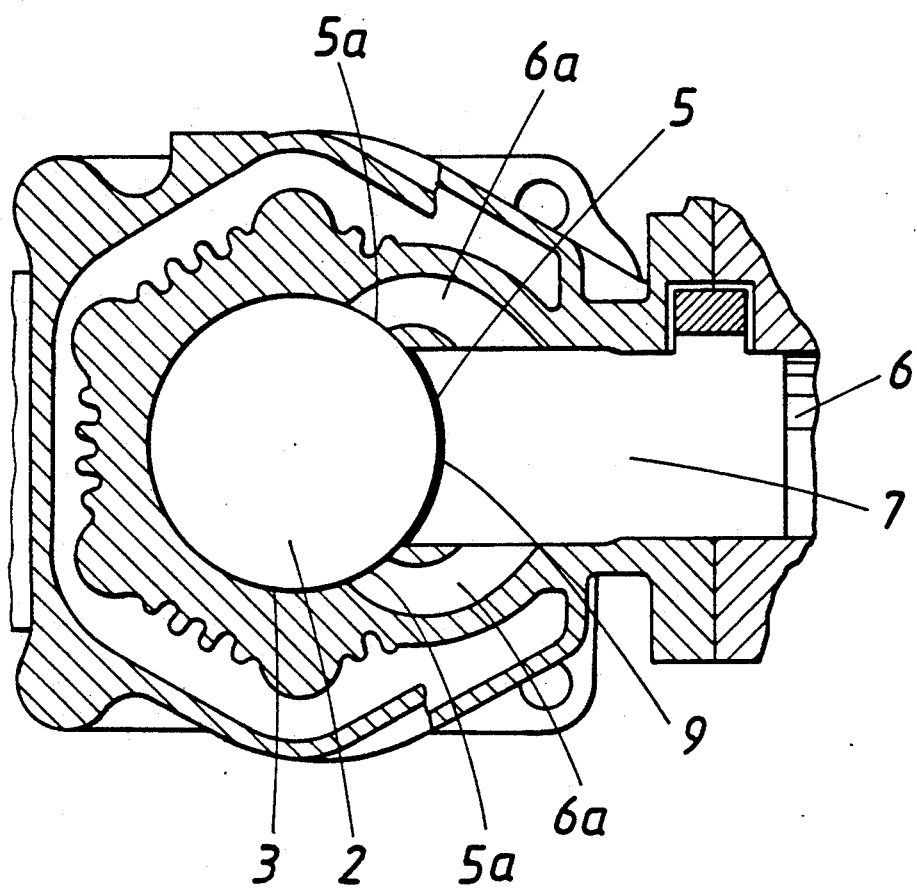
FIG. 3 is an associated transverse sectional view taken on line III—III in FIG. 1.
Figure 4:
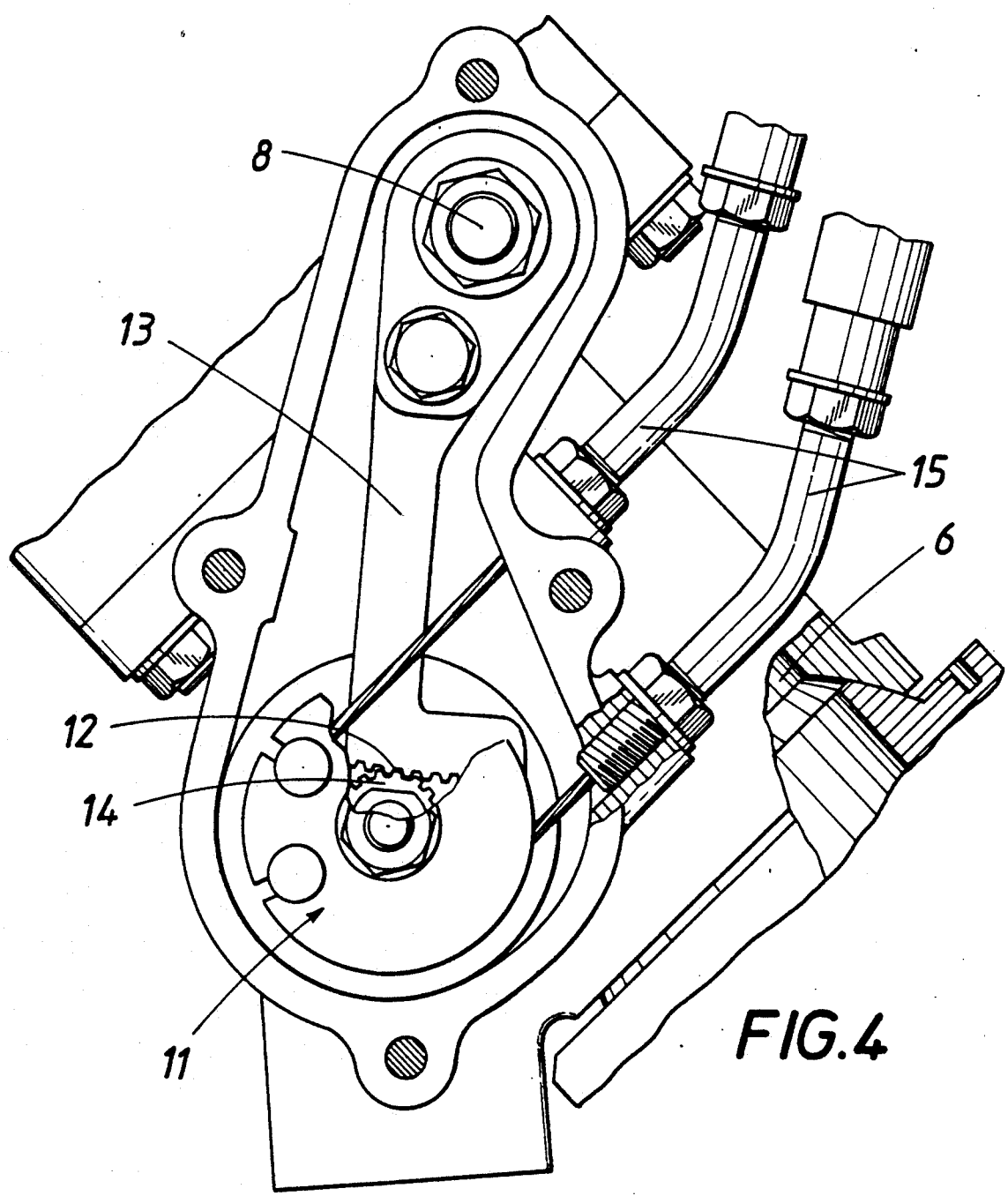
FIG. 4 is an external elevation showing on a larger scale those parts by which the control member is coupled to the means for closing the air chamber.

The two-stroke cycle internal combustion engine in accordance with the invention comprises a crankshaft 1, an associated piston 2 and a cylinder 3. Transfer passages 4 for the air-fuel mixture lead from the crankcase into the cylinder 3. An exhaust passage 6 extends from an exhaust port 5 formed in the cylinder wall and contains a control member 7, which conforms to the flow lines in the exhaust passage 6 and is mounted to be adjustable by means of a shaft 8 so that that edge 9 of the exhaust port 5 which is nearer to the crankshaft can be adjusted in the axial direction of travel of the piston 2. As is particularly apparent from FIG. 3 the exhaust passage consists of a main passage 6 and of two lateral exhaust passages 6a, which adjoin respective exhaust ports 5a and are arranged to be closed by the control member 7 when it is in its end position remote from the crankshaft, as is shown in FIGS. 1 and 3.

Figure 2:
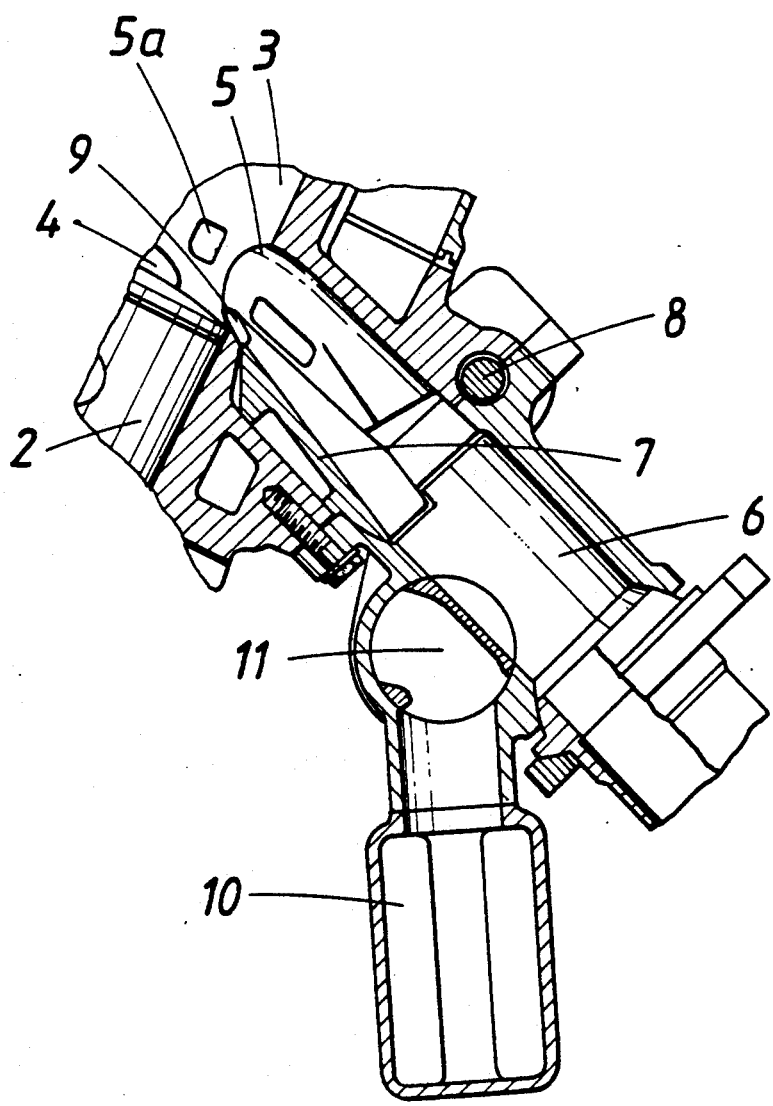
FIG. 2 is a similar view showing those parts which are essential for the invention with the control member in its position for an operation at higher speeds or under heavier loads.

The exhaust system of the internal combustion system comprises an air chamber 10, which is closed toward the outside and is adapted to be connected to the remainder of the exhaust system and by means of a rotary valve 11 can be closed or opened toward the exhaust passage 6. The shaft 8 for the control member 7 is coupled to a gear 14 on the shaft of the rotary valve 11 by means of a rod 13, which terminates in a toothed segment 12. As is apparent from FIGS. 1 and 2 the arrangement is such that the rotary valve 11 will be open when the control member 7 is in its end position remote from the crankshaft (FIG. 1) and will be closed when the control member 7 fully exposes the exhaust port 5 (FIG. 2). A rotation is imparted to the rotary valve 11 by a servomotor via Bowden cables 15.

We claim:

1. In a two-stroke-cycle internal combustion engine designed for crankcase scavenging and comprising
a crankshaft,
a cylinder disposed on one side of said crankshaft and extending toward said crankshaft in an axial direction of said cylinder and having a cylinder wall formed with an exhaust port which extends in said axial direction and has an edge proximal to said crankshaft,
means defining an exhaust passage opening into said cylinder through said exhaust port, and
a piston operatively connected to said crankshaft and movable in said cylinder in said axial direction and adapted to open and close said exhaust port,
the improvement comprising
a control member arranged in said exhaust passage and having an edge movable in said axial direction to control the flow area of said exhaust port in dependence on at least one operational parameter of said engine,
said control member edge constituting the proximal edge of said exhaust port for adjustment of said edge in said axial direction.

* * * * *